US009030636B2

(12) United States Patent
Yonekura et al.

(10) Patent No.: US 9,030,636 B2
(45) Date of Patent: May 12, 2015

(54) LIQUID CRYSTAL DISPLAY APPARATUS

(75) Inventors: Toshimasa Yonekura, Kanazawa (JP);
Masanobu Nonaka, Nonoichi (JP);
Kazuhiro Takahashi, Kanazawa (JP);
Masato Kesho, Kanazawa (JP)

(73) Assignee: Japan Display Inc., Tokyo (JP)

( * ) Notice: Subject to any disclaimer, the term of this patent is extended or adjusted under 35 U.S.C. 154(b) by 140 days.

(21) Appl. No.: 13/589,597

(22) Filed: Aug. 20, 2012

(65) Prior Publication Data
US 2013/0050627 A1   Feb. 28, 2013

(30) Foreign Application Priority Data
Aug. 26, 2011   (JP) ................. 2011-184548

(51) Int. Cl.
*G02F 1/1343*   (2006.01)

(52) U.S. Cl.
CPC ............ *G02F 1/134309* (2013.01); *G02F 2001/134318* (2013.01); *G02F 2001/134381* (2013.01)

(58) Field of Classification Search
USPC .................................. 349/141, 39
See application file for complete search history.

(56) References Cited

U.S. PATENT DOCUMENTS

| 5,434,690 | A  | * | 7/1995  | Hisatake et al. ............. 349/8 |
| 6,069,678 | A  | * | 5/2000  | Sakamoto et al. ............. 349/141 |
| 6,266,116 | B1 |   | 7/2001  | Ohta et al. |
| 6,542,212 | B2 | * | 4/2003  | Yoshida et al. ............. 349/141 |
| 6,549,258 | B1 |   | 4/2003  | Shin et al. |
| 8,610,863 | B2 | * | 12/2013 | Kwon et al. ............. 349/144 |
| 8,797,487 | B2 | * | 8/2014  | Koyama ............. 349/140 |
| 2001/0010575 | A1 |   | 8/2001  | Yoshida et al. |
| 2004/0165136 | A1 |   | 8/2004  | Sugiyama et al. |
| 2005/0206824 | A1 |   | 9/2005  | Son et al. |
| 2005/0219453 | A1 |   | 10/2005 | Kubo et al. |
| 2007/0115234 | A1 |   | 5/2007  | Kim et al. |
| 2008/0062358 | A1 |   | 3/2008  | Lee et al. |
| 2008/0180590 | A1 | * | 7/2008  | Lee et al. ............. 349/39 |
| 2008/0180623 | A1 | * | 7/2008  | Lee et al. ............. 349/139 |
| 2008/0186439 | A1 |   | 8/2008  | Kwon et al. |

FOREIGN PATENT DOCUMENTS

| JP | 6-222397 | 8/1994 |
| JP | 7-159807 | 6/1995 |

(Continued)

OTHER PUBLICATIONS

U.S. Appl. No. 13/548,644, filed Jul. 13, 2012, Kesho, et al.

(Continued)

*Primary Examiner* — James Dudek
(74) *Attorney, Agent, or Firm* — Oblon, McClelland, Maier & Neustadt, L.L.P.

(57) ABSTRACT

According to one embodiment, an apparatus includes a first substrate including a pixel electrode including a contact portion, main pixel electrodes extending in a second direction perpendicular to a first direction from two end portions of the contact portion in the first direction, and a connecting portion electrically connecting extended distal ends of the main pixel electrodes, a second substrate including a common electrode including main common electrodes extending substantially parallel to the main pixel electrode on either side of the main pixel electrode, and secondary common electrodes extending between the main common electrodes between the pixel electrodes juxtaposed in the second direction, and a liquid crystal layer.

6 Claims, 6 Drawing Sheets

(56) References Cited

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 10-232392 A | 9/1998 |
| JP | 2005-3802 | 1/2005 |
| JP | 3644653 | 2/2005 |
| JP | 2005-242307 | 9/2005 |
| JP | 2006-221021 A | 8/2006 |
| JP | 2006-276112 A | 10/2006 |
| JP | 2009-086127 A | 4/2009 |
| JP | 2009-192822 | 8/2009 |
| JP | 2010-145871 A | 7/2010 |

OTHER PUBLICATIONS

U.S. Appl. No. 13/590,643, filed Aug. 21, 2012, Kesho, et al.
U.S. Appl. No. 13/603,942, filed Sep. 5, 2012, Kesho, et al.
U.S. Appl. No. 13/614,344, filed Sep. 13, 2012, Kesho, et al.
Office Action issued on Mar. 11, 2014 in the corresponding Japanese patent Application No. 2011-184548 (with English Translation).
U.S. Appl. No. 13/676,566, filed Nov. 14, 2012, Kesho, et al.
U.S. Appl. No. 13/645,734, filed Oct. 5, 2012, Kesho, et al.
Office Action issued Jul. 8, 2014 in Japanese Patent Application No. 2011-184548 (with English language translation).

* cited by examiner

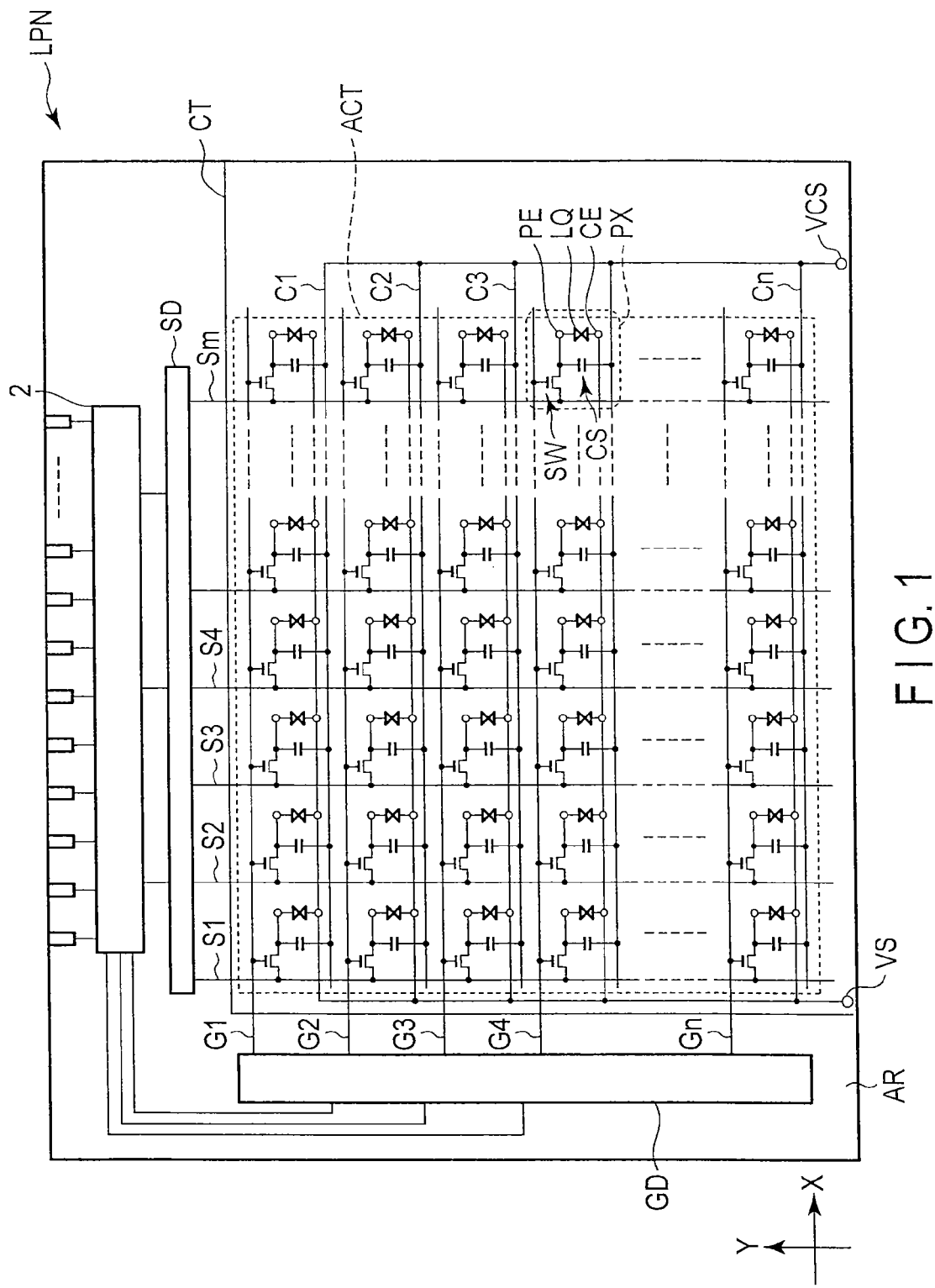
F I G. 1

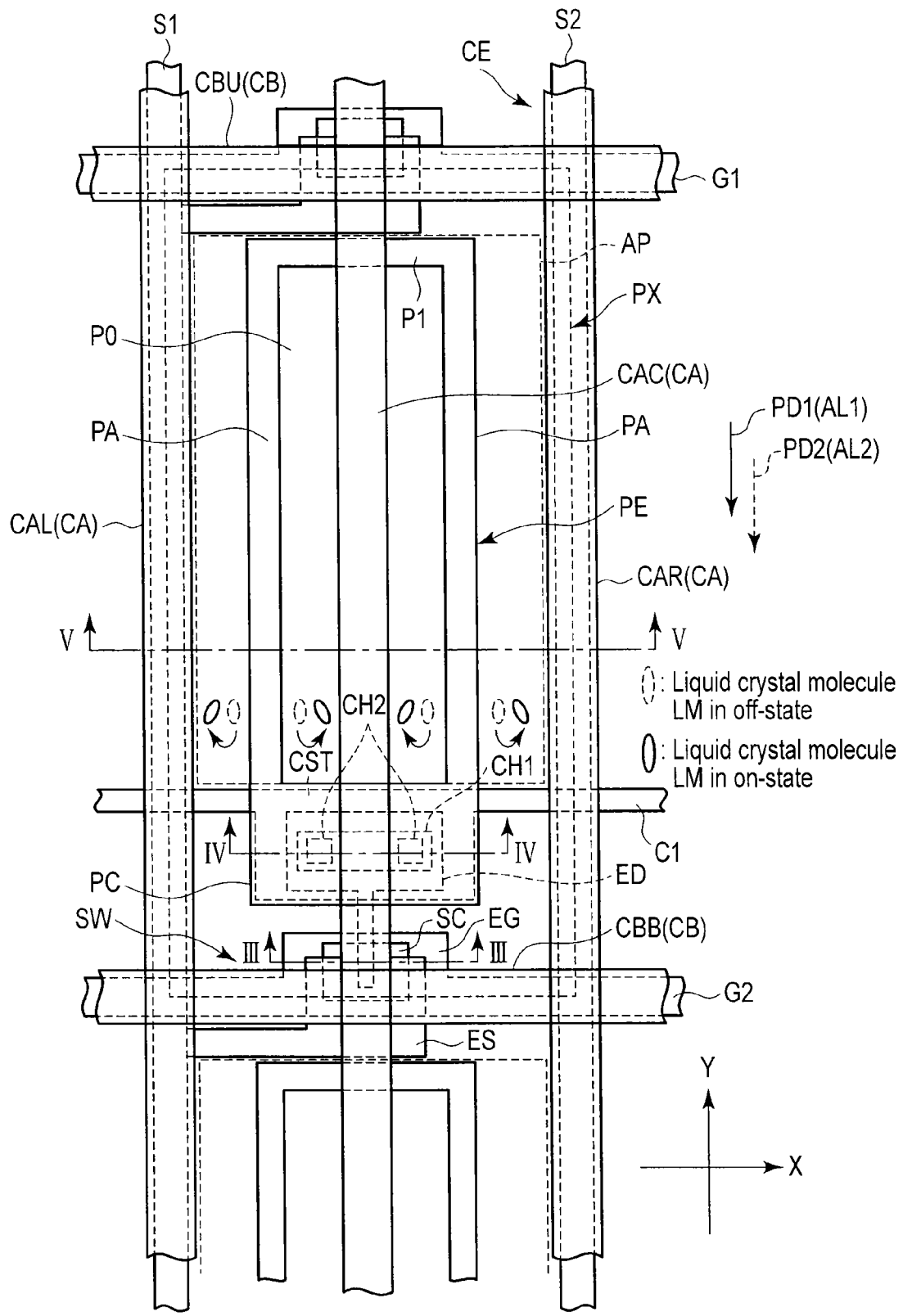
F I G. 2

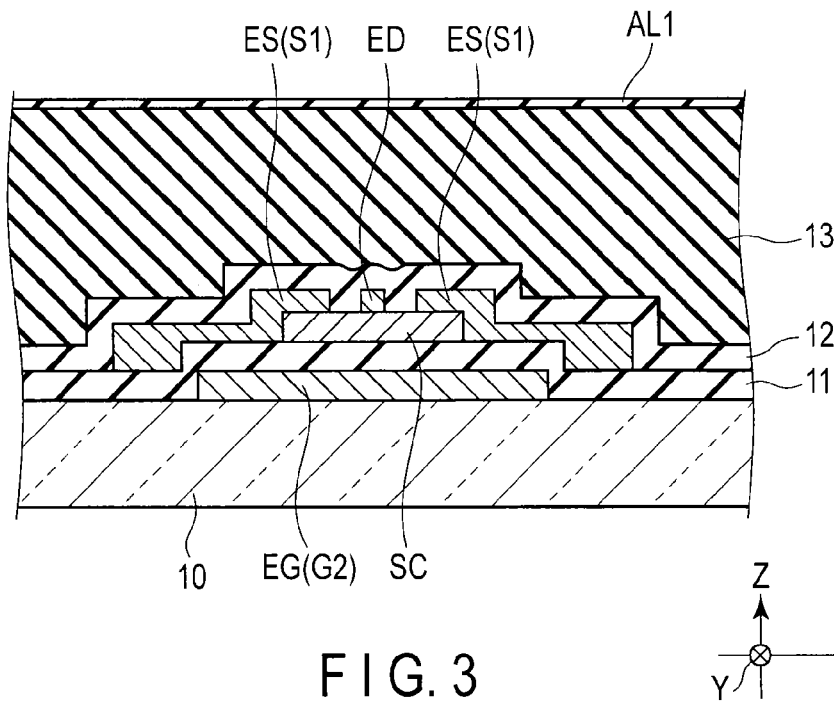
F I G. 3
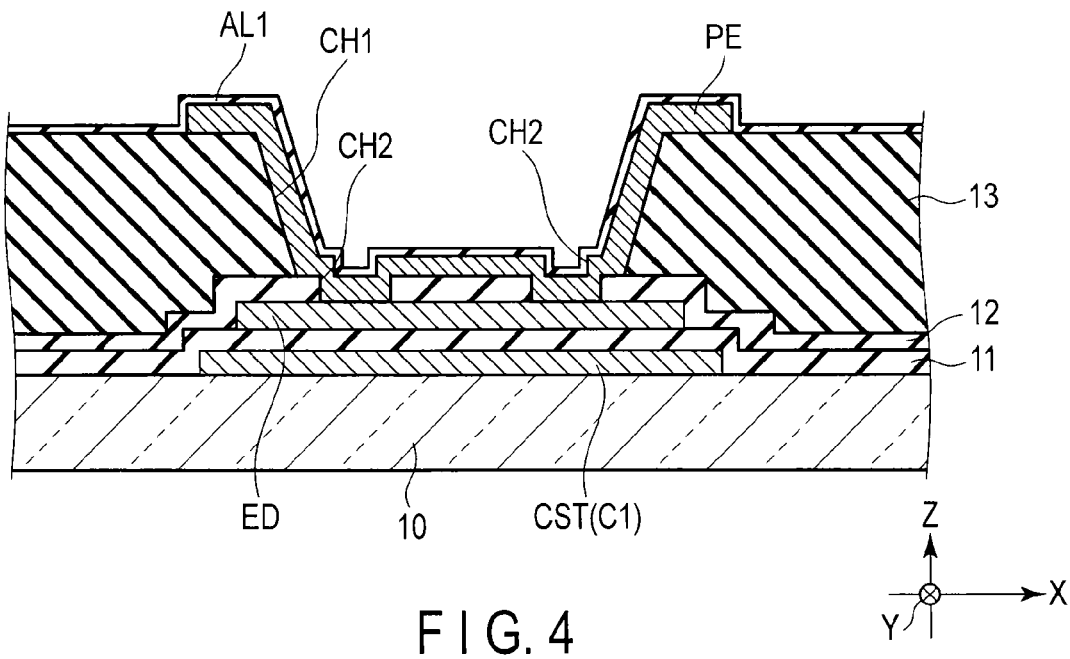
F I G. 4

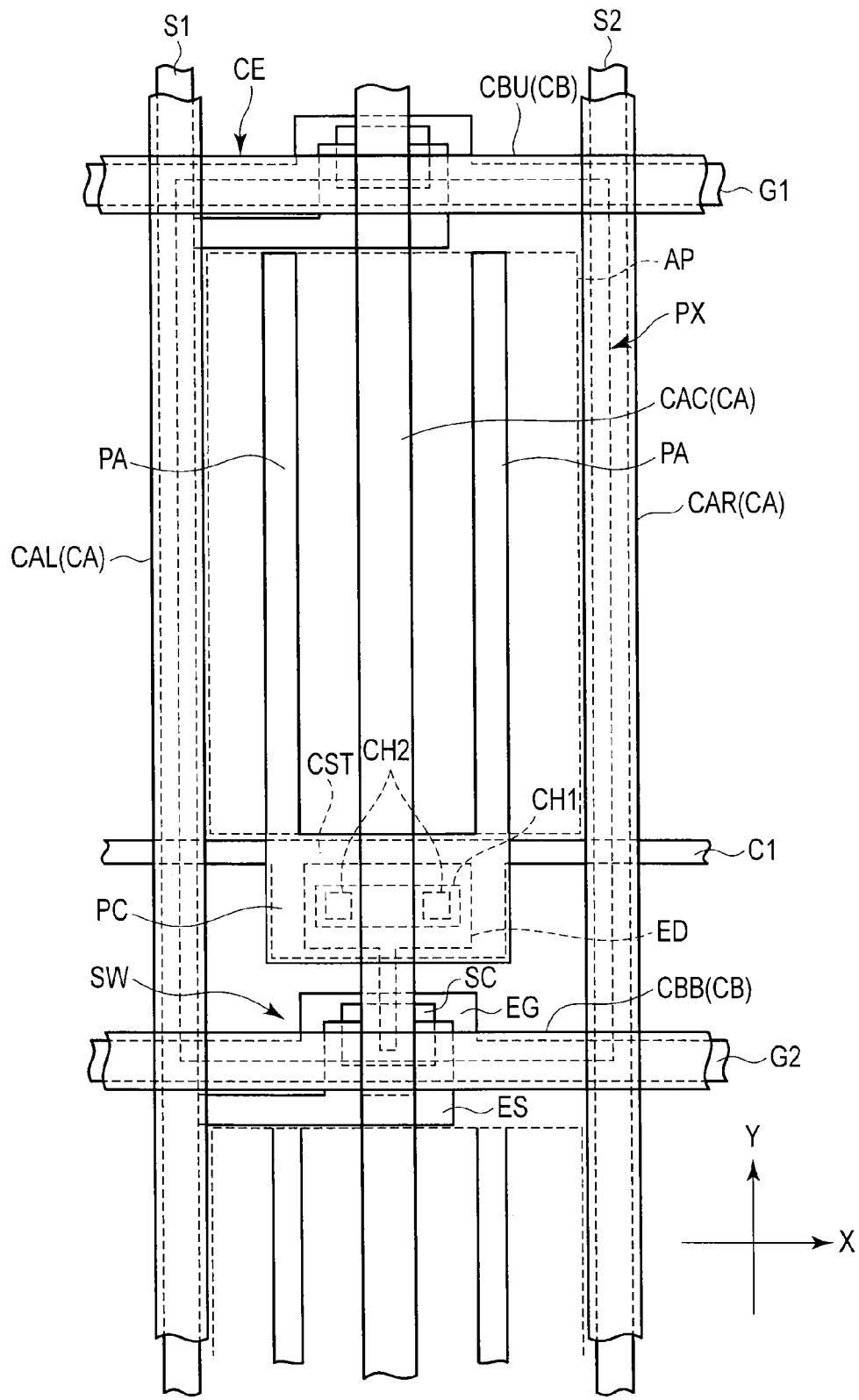
F I G. 6

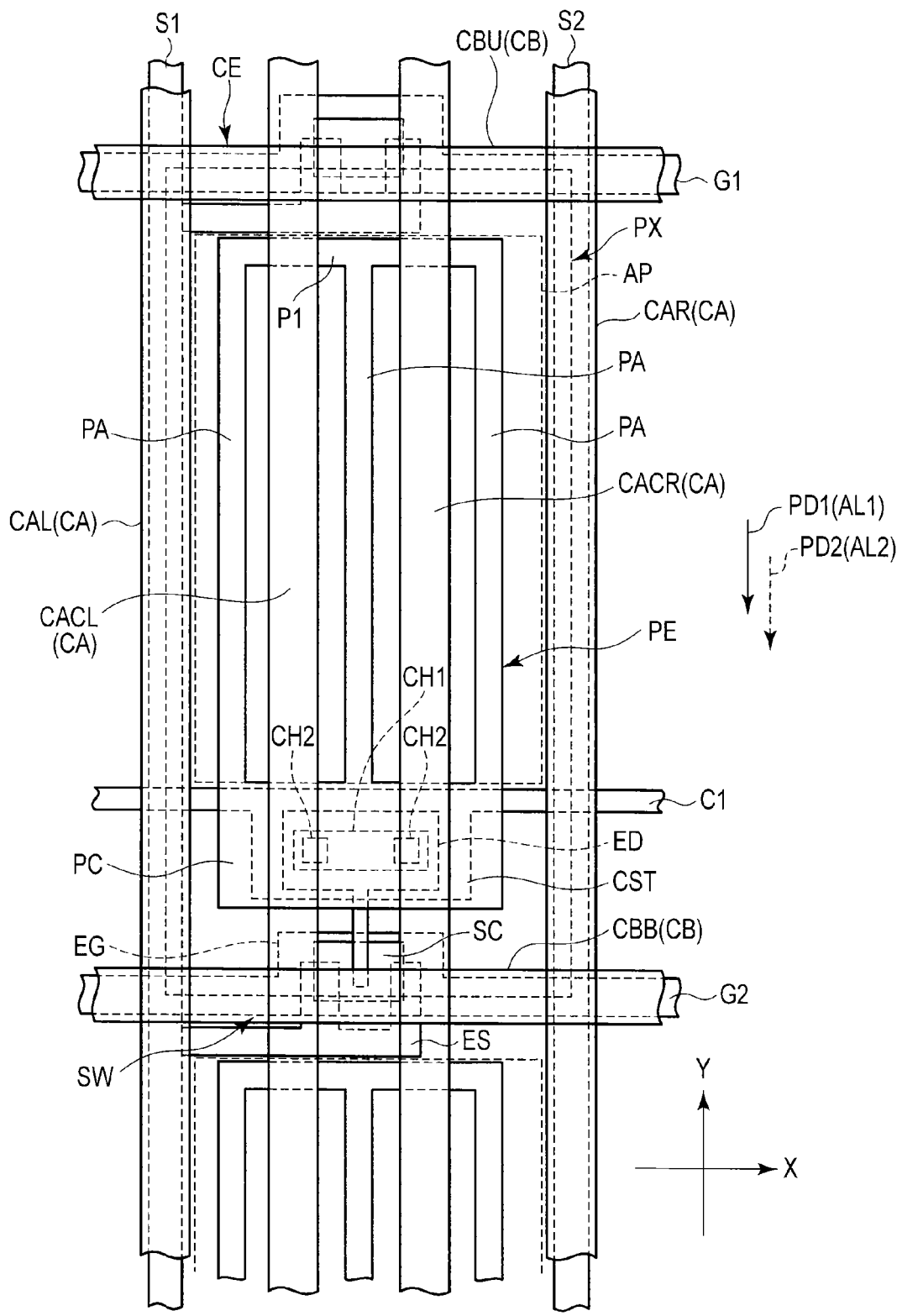
F I G. 7

LIQUID CRYSTAL DISPLAY APPARATUS

CROSS-REFERENCE TO RELATED APPLICATIONS

This application is based upon and claims the benefit of priority from Japanese Patent Application No. 2011-184548, filed Aug. 26, 2011, the entire contents of which are incorporated herein by reference.

FIELD

Embodiments described herein relate generally to liquid crystal display apparatus.

BACKGROUND

Recently, flat display apparatuses have extensively been developed, and particularly liquid crystal display apparatuses are attracting attention because they have the advantages that such as lightweight, low profile, and low power consumption. In particular, as an active matrix liquid crystal display apparatus incorporating a switching element in each pixel, a structure using a transverse electric field (including a fringe electric field) such as an IPS (In-Plane Switching) mode or FFS (Fringe Field Switching) mode is attracting attention. This transverse-electric-field-mode liquid crystal display apparatus includes a pixel electrode and counterelectrode formed on an array substrate, and switches liquid crystal molecules by a transverse electric field almost parallel to the major surface of the array substrate.

On the other hand, a technique of switching liquid crystal molecules by forming a transverse electric field or oblique electric field between a pixel electrode formed on an array substrate and a counterelectrode formed on a countersubstrate has been proposed.

BRIEF DESCRIPTION OF THE DRAWINGS

FIG. 1 is a schematic view showing the arrangement and equivalent circuit of a liquid crystal display apparatus according to an embodiment;

FIG. 2 is a schematic plan view showing a structure example of one pixel when a liquid crystal display panel shown in FIG. 1 is viewed from the countersubstrate side;

FIG. 3 is a schematic sectional view showing the sectional structure of an array substrate when the liquid crystal display panel shown in FIG. 2 is cut along line III-III;

FIG. 4 is a schematic sectional view showing the sectional structure of the array substrate when the liquid crystal display panel shown in FIG. 2 is cut along line IV-IV;

FIG. 6 is a schematic plan view showing a structure example of one pixel when a liquid crystal display panel LPN of a liquid crystal display apparatus according to a comparative example is viewed from the countersubstrate side; and FIG. 7 is a schematic plan view showing another structure example of one pixel when the liquid crystal display panel shown in FIG. 1 is viewed from the countersubstrate side.

DETAILED DESCRIPTION

Figure 5:
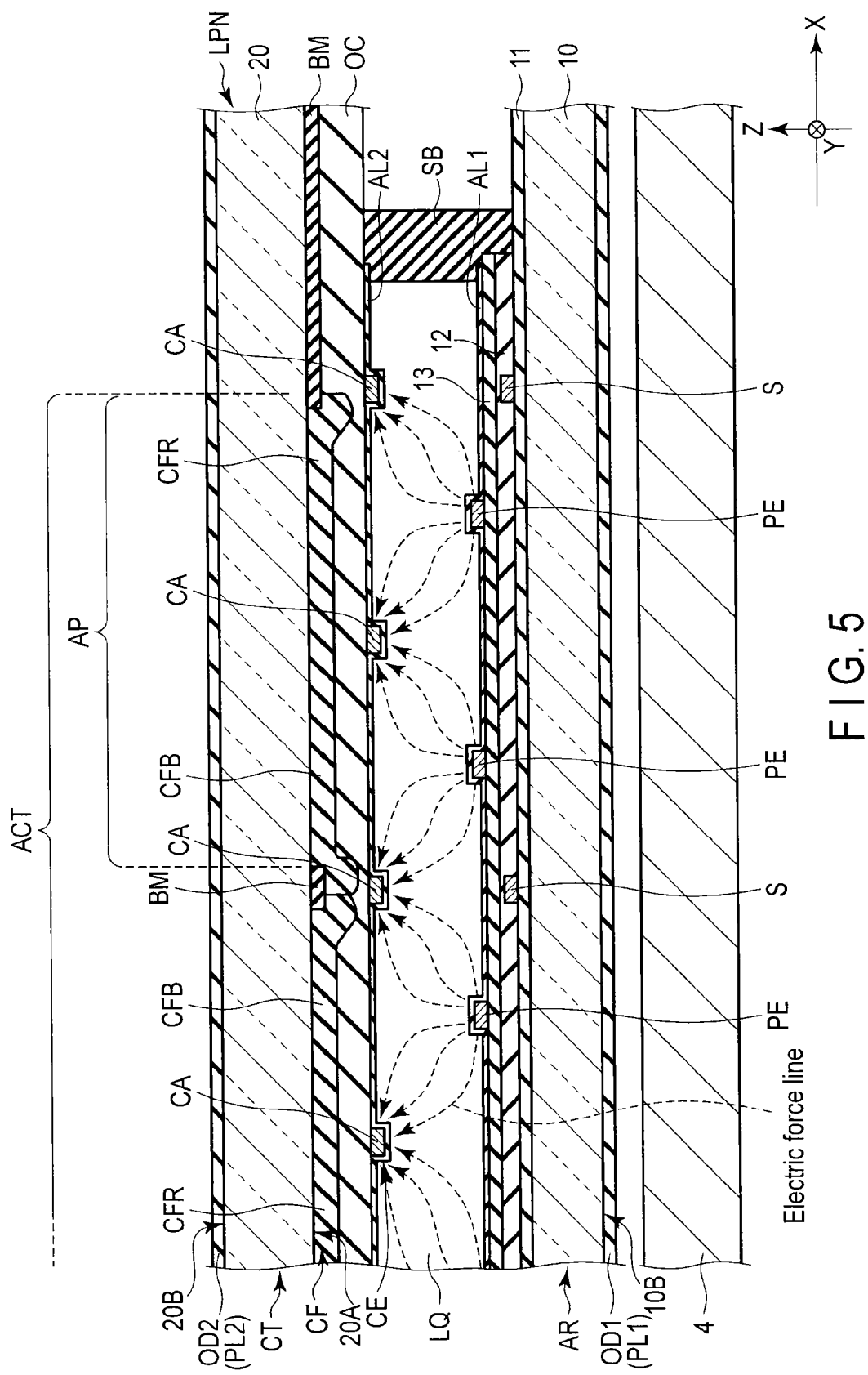
FIG. 5 is a schematic sectional view showing the sectional structure when the liquid crystal display panel shown in FIG. 2 is cut along line V-V.

In general, according to one embodiment, a liquid crystal display apparatus comprises a first substrate including a pixel electrode including a contact portion, main pixel electrodes extending in a second direction perpendicular to a first direction from two end portions of the contact portion in the first direction, and a connecting portion electrically connecting extended distal ends of the main pixel electrodes; a second substrate including a common electrode including main common electrodes extending substantially parallel to the main pixel electrode on either side of the main pixel electrode, and secondary common electrodes extending between the main common electrodes between the pixel electrodes juxtaposed in the second direction; and a liquid crystal layer containing liquid crystal molecules held between the first substrate and the second substrate.

An embodiment will be explained in detail below with reference to the accompanying drawings. Note that in these drawings, the same reference numerals denote constituent elements that achieve the same or similar functions, and a repetitive explanation will be omitted.

FIG. 1 is a schematic view showing the arrangement and equivalent circuit of a liquid crystal display apparatus according to the embodiment.

That is, the liquid crystal display apparatus includes an active matrix liquid crystal display panel LPN. The liquid crystal display panel LPN includes an array substrate AR as a first substrate, a countersubstrate CT as a second substrate opposing the array substrate AR, and a liquid crystal layer LQ held between the array substrate AR and countersubstrate CT. The liquid crystal display panel LPN as described above has an active area ACT for displaying images. The active area ACT includes a plurality of pixels PX arranged in an m×n matrix (m and n are positive integers).

In the active area ACT, the liquid crystal display panel LPN includes n gate lines G (G1 to Gn), n auxiliary capacitance lines C (C1 to Cn), and m source lines S (S1 to Sm). The gate lines G and auxiliary capacitance lines C extend almost linearly along, for example, a first direction X. The gate lines G and auxiliary capacitance lines C are alternately arranged parallel to one another along a second direction Y perpendicular to the first direction X. The first direction X and second direction Y are almost perpendicular to each other. The source lines S intersect the gate lines G and auxiliary capacitance lines C. The source lines S extend almost linearly along the second direction Y. Note that the gate lines G, auxiliary capacitance lines C, and source lines S need not extend linearly, and portions of these lines may also be bent.

Each gate line G is extracted outside the active area ACT, and connected to a gate driver GD. Each source line S is extracted outside the active area ACT, and connected to a source driver SD. At least portions of the gate driver GD and source driver SD are connected to a driving IC chip 2 formed on the array substrate AR and incorporating a controller.

Each pixel PX includes a switching element SW, pixel electrode PE, and common electrode CE. A retention capacitance Cs is formed between, for example, the auxiliary capacitance line C and pixel electrode PE. The auxiliary capacitance line C is electrically connected to a voltage application unit VCS to which an auxiliary capacitance voltage is applied.

Note that in this embodiment, the liquid crystal display panel LPN has an arrangement in which the pixel electrodes PE are formed on the array substrate AR and at least some common electrodes CE are formed on the countersubstrate CT, and liquid crystal molecules in the liquid crystal layer LQ are switched by mainly using an electric field formed between the pixel electrode PE and common electrode CE. The electric field formed between the pixel electrode PE and common electrode CE is an oblique electric field slightly inclined to an X-Y plane defined by the first direction X and second direction Y or to the major substrate surface (or a transverse electric field almost parallel to the major substrate surface).

The switching element SW is, for example, an n-channel, thin-film transistor (TFT). The switching element SW is electrically connected to the gate line G and source line S. The switching element SW can be either a top-gate element or bottom-gate element. Although the semiconductor layer of the switching element SW is made of, for example, amorphous silicon, it may also be made of polysilicon.

The pixel electrode PE is formed in each pixel PX and electrically connected to the switching element SW. The common electrode CE is formed for the pixel electrodes PE of a plurality of pixels PX through the liquid crystal layers LQ. The pixel electrode PE and common electrode CE are made of a light-transmitting conductive material such as indium tin oxide (ITO) or indium zinc oxide (IZO), but they may also be made of another metal material such as aluminum.

The array substrate AR includes a power supply unit VS for applying a voltage to the common electrode CE. The power supply unit VS is formed, for example, outside the active area ACT. The common electrode CE is extracted outside the active area ACT, and electrically connected to the power supply unit VS via a conductive member (not shown).

FIG. 2 is a schematic plan view showing a structure example of one pixel PX when the liquid crystal display panel LPN shown in FIG. 1 is viewed from the countersubstrate side. That is, FIG. 2 shows a plan view taken along the X-Y plane.

As indicated by the broken lines, the pixel PX shown in FIG. 2 has a rectangular shape in which a length along the first direction X is shorter than a length along the second direction Y. Note that in this embodiment, the width of the pixel PX in the first direction X is about 60 µm, and the width of the pixel PX in the second direction Y is about 180 µm.

Gate lines G1 and G2 extend along the first direction X. The auxiliary capacitance line C1 is formed between gate lines G1 and G2 adjacent to each other, and extends along the first direction X. Source lines S1 and S2 extend along the second direction Y. The pixel electrode PE is formed between source lines S1 and S2 adjacent to each other. Also, the pixel electrode PE is positioned between gate lines G1 and G2.

In this example of the pixel PX shown in FIG. 2, source line S1 is formed in the left end portion, and source line S2 is formed in the right end portion. Strictly speaking, source line S1 is formed over the boundary between the pixel PX and an adjacent pixel on the left side, and source line S2 is formed over the boundary between the pixel PX and an adjacent pixel on the right side. Also, in the pixel PX, gate line G1 is formed in the upper end portion, and gate line G2 is formed in the lower end portion. Strictly speaking, gate line G1 is formed over the boundary between the pixel PX and an adjacent pixel above it, and gate line G2 is formed over the boundary between the pixel PX and an adjacent pixel below it. The auxiliary capacitance line C1 is formed in the vicinity of the lower end portion of the pixel PX (i.e., in the vicinity of the switching element SW connected to the pixel electrode PE of the pixel PX).

In the example shown in FIG. 2, the switching element SW is electrically connected to gate line G2 and source line S1. The switching element SW is formed near the intersection of gate line G2 and source line S1.

The switching element SW has a gate electrode EG electrically connected to (or integrated with) gate line G2, a source electrode ES electrically connected to (or integrated with) source line S1, and a drain electrode ED electrically connected to the pixel electrode PE in a contact portion PC through a contact hole CH formed in a region overlapping the auxiliary capacitance line C1.

The drain electrode ED of the switching element SW extends upward from the lower end portion of the pixel PX along the second direction Y, and spreads below the pixel electrode PE. The auxiliary capacitance line C1 has a projection CsT projecting toward the switching element SW, in an almost central portion of the pixel PX in the first direction X.

FIG. 3 is a schematic sectional view showing the sectional structure of the array substrate AR when the liquid crystal display panel LPN shown in FIG. 2 is cut along line III-III.

The gate electrode EG of the switching element SW is formed on a first insulating substrate 10. The gate electrode EG is covered with a first interlayer dielectric film 11. A semiconductor layer SC made of amorphous silicon is formed on the first interlayer dielectric film 11 on the gate electrode EG. The source electrode ES and drain electrode ED are formed on the semiconductor layer SC. The end portion of the source electrode ES branches into two portions arranged on the two end portions of the semiconductor layer SC in the first direction X. The drain electrode ED is formed on the semiconductor layer SC between two source electrodes ES in the first direction X. The source electrode ES and drain electrode ED are covered with a second interlayer dielectric film 12. A planarizing film 13 is formed on the second interlayer dielectric film 12, and covered with a first alignment film AL1.

FIG. 4 is a schematic sectional view showing the sectional structure of the array substrate AR when the liquid crystal display panel LPN shown in FIG. 2 is cut along line IV-IV.

The projection CsT of the auxiliary capacitance line C1 is formed on the first insulating substrate 10. The drain electrode ED opposes the projection CsT with the first interlayer dielectric film 11 being sandwiched between them. The drain electrode ED is covered with the second interlayer dielectric film 12. The second interlayer dielectric film 12 has a contact hole CH2 that exposes the drain electrode ED. In this example, two contact holes CH2 are formed. The planarizing film 13 is formed on the second interlayer dielectric film 12. A contact hole CH1 for exposing the two contact holes CH2 in the second interlayer dielectric film 12 is formed in the planarizing film 13. The pixel electrode PE is formed on the planarizing film 13. The pixel electrode PE is electrically connected to the drain electrode ED in contact hole CH1 and contact holes CH2. The pixel electrode PE and planarizing film 13 are covered with the first alignment film AL1.

As shown in FIG. 2, the pixel electrode PE includes main pixel electrodes PA, a connecting portion P1, and the contact portion PC electrically connected to each other. The contact portion PC is formed in the vicinity of the lower end portion of the pixel PX (i.e., in the vicinity of the switching element SW connected to the pixel electrode PE of the pixel PX). The contact portion PC is positioned in a region overlapping the auxiliary capacitance line C1, and electrically connected to the drain electrode ED of the switching element SW through the contact hole CH. The contact portion PC is made wider than the main pixel electrode PA.

The main pixel electrodes PA linearly extend along the second direction Y from two portions of the contact portion PC to the vicinity of the upper end portion of the pixel PX. The main pixel electrodes PA are electrically connected to each other by the connecting portion P1 extending in the first direction X in the vicinity of the upper end portion of the pixel PX. That is, the pixel electrode PE has an almost rectangular opening PO surrounded by the main pixel electrodes PA, connecting portion P1, and contact portion PC. The opening PO is formed in a position almost intermediate between source lines S1 and S2, i.e., in the center of the pixel PX.

Note that the pixel electrode PE is formed to be symmetrical with respect to the formation position of the drain electrode ED of the switching element SW in the first direction X. In other words, the drain electrode ED is formed in the center of the pixel electrode PE in the first direction X. When the pixel electrode PE is thus formed to be symmetrical with respect to the drain electrode ED, the potential distribution of the pixel electrode PE becomes symmetrical in the first direction X. Since this eliminates the localized transmittance, the decrease in display quality can be suppressed.

The common electrode CE includes main common electrodes CA and secondary common electrodes CB on the countersubstrate CT. In the X-Y plane, the main common electrodes CA linearly extend along the second direction Y almost parallel to the main pixel electrodes PA on either side of the main pixel electrodes PA. Alternatively, the main common electrode CA opposes the source line S or opening PO, and extends almost parallel to the main pixel electrodes PA. The main common electrode CA as described above is formed into a band-like shape having almost the same width along the first direction X.

In the example shown in FIG. 2, three main common electrodes CA are arranged parallel to one another along the first direction X, and they are positioned in the left and right end portions and central portion of the pixel PX. In the following explanation, the main common electrode on the left side of FIG. 2 will be called CAL, the main common electrode on the right side of FIG. 2 will be called CAR, and the main common electrode in the center of FIG. 2 will be called CAC, in order to distinguish between the main common electrodes CA. Main common electrode CAL opposes source line S1, main common electrode CAR opposes source line S2, and main common electrode CAC opposes the opening PO in the pixel electrode PE. Main common electrodes CAL, CAR, and CAC are electrically connected to each other inside or outside the active area.

In the pixel PX, main common electrode CAL is formed in the left end portion, and main common electrode CAR is formed in the right end portion. Strictly speaking, main common electrode CAL is formed over the boundary between the pixel PX and an adjacent pixel on the left side, and main common electrode CAR is formed over the boundary between the pixel PX and an adjacent pixel on the right side. Main common electrode CAC is formed in almost the center of the pixel PX in the first direction X.

In the X-Y plane, the secondary common electrode CB linearly extends along the first direction X between the openings PO of the pixel electrodes PE juxtaposed in the second direction Y. The secondary common electrode CB extends almost perpendicularly to the main pixel electrodes PA. The secondary common electrode CB as described above is formed into a band-like shape having almost the same width along the second direction Y.

In the example shown in FIG. 2, the secondary common electrodes CB are formed between the pixel electrodes PE juxtaposed in the second direction Y, and are positioned on the upper and lower sides of the pixel PX. In the following explanation, the secondary common electrode on the upper side of FIG. 2 will be called CBU, and the secondary common electrode on the lower side of FIG. 2 will be called CBB, in order to distinguish between the secondary common electrodes CB. Secondary common electrode CBU opposes gate line G1, and secondary common electrode CBB opposes gate line G2. Secondary common electrodes CBU and CBB are electrically connected to each other inside or outside the active area. That is, the common electrode CE is formed into a lattice shape in the active area.

In the pixel PX, secondary common electrode CBU is formed in the upper end portion, and secondary common electrode CBB is formed in the lower end portion. Strictly speaking, secondary common electrode CBU is formed over the boundary between the pixel PX and an adjacent pixel above it, and secondary common electrode CBB is formed over the boundary between the pixel PX and an adjacent pixel below it.

The positional relationship between the pixel electrode PE and main common electrodes CA is such that the main pixel electrodes PA and main common electrodes CA are alternately arranged along the first direction X. The main pixel electrodes PA and main common electrodes CA are arranged almost parallel to one another. In the X-Y plane, main common electrodes CAL, CAR, and CAC do not overlap the main pixel electrodes PA.

That is, one main pixel electrode PA exists between the adjacent main common electrodes CAL and CAC, and between the adjacent main common electrodes CAR and CAC. In other words, main common electrodes CAL, CAR, and CAC are arranged on either side of a position immediately above the main pixel electrode PA. Alternatively, the main pixel electrode PA is positioned between main common electrodes CAL and CAC, and between main common electrodes CAR and CAC. Therefore, main common electrode CAL, main pixel electrode PA, main common electrode CAC, main pixel electrode PA, and main common electrode CAR are arranged in this order along the first direction X.

The spacings between the pixel electrode PE and common electrodes CE along the first direction X are almost constant. That is, the spacing between main common electrode CAL and main pixel electrode PA along the first direction X, the spacing between main common electrode CAC and main pixel electrode PA along the first direction X, and the spacing between main common electrode CAR and main pixel electrode PA along the first direction X are almost equal. Also, the main pixel electrodes PA are surrounded by the main common electrodes CA and secondary common electrodes CB.

FIG. 5 is a schematic sectional view showing the sectional structure when the liquid crystal display panel LPN shown in FIG. 2 is cut along line V-V. Note that FIG. 5 shows only portions necessary for explanation.

A backlight 4 is placed at the back of the array substrate AR forming the liquid crystal display panel LPN. Various forms are applicable as the backlight 4, and it is possible to apply either a light-emitting diode (LED) or cold cathode fluorescent lamp (CCFL) as a light source. An explanation of details of the structure will be omitted.

The array substrate AR is formed by using the first insulating substrate 10 having light transmission properties. The source lines S are formed on the first interlayer dielectric film 11 and covered with the second interlayer dielectric film 12. Note that the gate lines and auxiliary capacitance lines not shown in FIG. 5 are arranged between, for example, the first insulating substrate 10 and first interlayer dielectric film 11. The planarizing film 13 is formed on the second interlayer dielectric film 12. The pixel electrodes PE are formed on the planarizing film 13. Each pixel electrode PE is formed inside a position immediately above an adjacent source line S.

The first alignment film AL1 is formed on that surface of the array substrate AR, which opposes the countersubstrate CT, and extends over almost the whole active area ACT. The first alignment film AL1 covers the pixel electrodes PE and the like, and is also formed on the planarizing film 13. The first alignment film AL1 as described above is made of a material exhibiting horizontal alignment.

Note that the array substrate AR may also include portions of the common electrodes CE.

The countersubstrate CT is formed by using a second insulating substrate 20 having light transmission properties. The countersubstrate CT includes black matrix BM, color filters CF, an overcoat layer OC, the common electrodes CE, and a second alignment film AL2.

The black matrix BM defines each pixel PX, and form an aperture AP facing the pixel electrode PE. That is, the black matrix BM is so formed as to face interconnections such as the source lines S, gate lines, auxiliary capacitance lines, and switching elements. Although FIG. 5 shows only portions of the black matrix BM, which extend along the second direction Y, the black matrix BM may also have portions extending along the first direction X. The black matrix BM is arranged on an inner surface 20A of the second insulating substrate 20, which faces the array substrate AR.

The color filters CF are arranged in one-to-one correspondence with the pixels PX. That is, the color filters CF are arranged in the openings AP in the inner surface 20A of the second insulating substrate 20, and partially formed on the black matrix BM. The color filters CF formed on the pixels PX adjacent to each other in the first direction X have different colors. For example, the color filters CF are made of resin materials colored in three primary colors, i.e., red, blue, and green. A red color filter CFR made of a resin material colored in red is formed for a red pixel. A blue color filter CFB made of a resin material colored in blue is formed for a blue pixel. A green color filter (not shown) made of a resin material colored in green is formed for a green pixel. The boundaries between the color filters CF overlap the black matrix BM.

The overcoat layer OC covers the color filters CF. The overcoat layer OC reduces the influence of the surface roughness of the color filters CF.

The common electrodes CE are formed on the surface of the overcoat layer OC, which faces the array substrate AR. The spacing between the common electrodes CE and pixel electrodes PE along a third direction Z is almost constant. The third direction Z is a direction perpendicular to the first direction X and second direction Y, or the normal direction of the liquid crystal display panel LPN.

The second alignment film AL2 is formed on the surface of the countersubstrate CT, which faces the array substrate AR, and extends over almost the whole active area ACT. The second alignment film AL2 covers the common electrodes CE, overcoat layer OC, and the like. The second alignment film AL2 as described above is made of a material exhibiting horizontal alignment.

An alignment process (for example, a rubbing process or photo-alignment process) for initially aligning the liquid crystal molecules in the liquid crystal layer LQ is performed on the first and second alignment films AL1 and AL2. A first alignment process direction PD1 in which the first alignment film AL1 initially aligns the liquid crystal molecules and a second alignment process direction PD2 in which the second alignment film AL2 initially aligns the liquid crystal molecules are parallel and opposite directions or the same direction. For example, the first and second alignment process directions PD1 and PD2 are almost parallel to the second direction Y and the same direction as shown in FIG. 2.

The array substrate AR and countersubstrate CT as described above are arranged such that the first and second alignment films AL1 and AL2 oppose each other. In this state, a predetermined cell gap, for example, a cell gap of 2 to 7 μm is formed between the first alignment film AL1 of the array substrate AR and the second alignment film AL2 of the countersubstrate CT by columnar spacers formed to be integrated with one of these substrates by using a resin material or the like. With the predetermined cell gap being thus formed, the array substrate AR and countersubstrate CT are adhered by a sealing material SB outside the active area ACT.

The liquid crystal layer LQ is formed between the first and second alignment films AL1 and AL2, as it is held by the cell gap formed between the array substrate AR and countersubstrate CT. The liquid crystal layer LQ as described above is made of a liquid crystal material having positive (type) dielectric anisotropy.

A first optical element OD1 is adhered by an adhesive or the like on the outer surface of the array substrate AR, i.e., an outer surface 10B of the first insulating substrate 10 forming the array substrate AR. The first optical element OD1 is positioned on a side facing the backlight 4 of the liquid crystal display panel LPN, and controls the polarized state of incident light entering the liquid crystal display panel LPN from the backlight 4. The first optical element OD1 includes a first polarizing plate PL1 having a first polarization axis (or first absorption axis).

A second optical element OD2 is adhered by an adhesive or the like on the outer surface of the countersubstrate CT, i.e., an outer surface 20B of the second insulating substrate 20 forming the countersubstrate CT. The second optical element OD2 is positioned on the display surface side of the liquid crystal display panel LPN, and controls the polarized state of exit light from the liquid crystal display panel LPN. The second optical element OD2 includes a second polarizing plate PL2 having a second polarization axis (or second absorption axis).

The first polarization axis of the first polarizing plate PL1 and the second polarization axis of the second polarizing plate PL2 have, for example, a crossed positional relationship (crossed-Nicol). In this state, one polarizing plate is set such that its polarization axis is parallel or perpendicular to the initial alignment direction of the liquid crystal molecules, i.e., the first or second alignment process direction PD1 or PD2. When the initial alignment direction is parallel to the second direction Y, the polarization axis of one polarizing plate is parallel to the second direction Y or first direction X.

Next, the operation of the liquid crystal display panel LPN having the above arrangement will be explained with reference to FIGS. 2 and 5.

That is, when no voltage is applied to the liquid crystal layer LQ, i.e., when no potential difference (or no electric field) is formed between the pixel electrode PE and common electrode CE (an off-state), a liquid crystal molecule LM in the liquid crystal layer LQ is aligned such that the long axis of the molecule points in the first alignment process direction PD1 of the first alignment film AL1 and the second alignment process direction PD2 of the second alignment film AL2. This off-state corresponds to the initial aligned state, and the alignment direction of the liquid crystal molecule LM in the off-state corresponds to the initial alignment direction.

Strictly speaking, the liquid crystal molecule LM is not always aligned parallel to the X-Y plane, and often causes pretilt. Therefore, the initial alignment direction of the liquid crystal module LM is a direction in which the long axis of the liquid crystal molecule LM in the off-state is orthographically projected on the X-Y plane. To simplify the explanation, the following explanation will be made by assuming that the liquid crystal molecule LM is aligned parallel to the X-Y plane and rotates in a plane parallel to the X-Y plane.

In this embodiment, both the first and second alignment process directions PD1 and PD2 are almost parallel to the second direction Y. In the off-state, the liquid crystal molecule LM is initially aligned such that the long axis is almost parallel to the second direction Y, as indicated by the broken lines in FIG. 2. That is, the initial alignment direction of the liquid crystal molecule LM is parallel to the second direction Y (or makes 0° with the second direction Y).

When the first and second alignment process directions PD1 and PD2 are parallel and the same direction as in this example shown in FIG. 2, in the section of the liquid crystal layer LQ, the liquid crystal molecules LM are aligned almost horizontally (at an almost zero pretilt angle) near the middle portion of the liquid crystal layer LQ, and are aligned (by spray alignment), in the vicinities of the first and second alignment films AL1 and AL2, at a pretilt angle at which they are symmetrical with respect to the middle portion of the liquid crystal layer LQ as a boundary.

When the first alignment film AL1 is aligned in the first alignment process direction PD1, the liquid crystal molecules LM near the first alignment film AL1 are initially aligned in the first alignment process direction PD1. When the second alignment film AL2 is aligned in the second alignment process direction PD2, the liquid crystal molecules LM near the second alignment film AL2 are initially aligned in the second alignment process direction PD2. When the first and second alignment process directions PD1 and PD2 are parallel and the same direction, the liquid crystal molecules LM are aligned by spray alignment as described above, and the alignment of the liquid crystal molecules LM near the first alignment film AL1 on the array substrate AR and the alignment of the liquid crystal molecules LM near the second alignment film AL2 on the countersubstrate CT are symmetrical above and below the middle portion of the liquid crystal layer LQ as a boundary. Accordingly, optical compensation is performed even in a direction inclined from the normal direction of the substrate. When the first and second alignment process directions PD1 and PD2 are parallel and the same direction, therefore, a light leak is little in black display, a high contrast ratio can be achieved, and the display quality can be improved.

Note that when the first and second alignment process directions PD1 and PD2 are parallel and opposite directions, the liquid crystal molecules LM are aligned (by homogeneous alignment) at an almost uniform pretilt angle near the first and second alignment films AL1 and AL2 and in the middle portion of the liquid crystal layer LQ, in the section of the liquid crystal layer LQ.

A part of the backup light from the backlight 4 is transmitted through the first polarizing plate PL1 and enters the liquid crystal display panel LPN. The polarized state of the light having entered the liquid crystal display panel LPN changes in accordance with the aligned state of the liquid crystal molecules LM when the light passes through the liquid crystal layer LQ. In the off-state, the second polarizing plate PL2 absorbs the light having passed through the liquid crystal layer LQ (black display).

On the other hand, when a voltage is applied to the liquid crystal layer LQ, i.e., when a potential difference (or an electric field) is formed between the pixel electrode PE and common electrode CE (an on-state), a transverse electric field (or an oblique electric field) almost parallel to the substrate is formed between the pixel electrode PE and common electrode CE. Under the influence of this electric field, the long axes of the liquid crystal molecules LM rotate in a plane almost parallel to the X-Y plane as indicated by the solid lines in FIG. 2.

In the example shown in FIG. 2, in a region between the main pixel electrode PA and main common electrode CAL and in a region between the main pixel electrode PA and main common electrode CAC, the liquid crystal molecules LM rotate clockwise in the second direction Y, and are aligned to point the lower left corner of the drawing surface. In a region between the main pixel electrode PA and main common electrode CAR and in a region between the main pixel electrode PA and main common electrode CAC, the liquid crystal molecules LM rotate counterclockwise in the second direction Y, and are aligned to point the lower right corner of the drawing surface.

When an electric field is thus formed between the pixel electrode PE and common electrode CE in each pixel PX, the alignment direction of the liquid crystal molecules LM divides into a plurality of directions from the position overlapping the pixel electrode PE as a boundary, and a domain is formed in each alignment direction. That is, a plurality of domains are formed in one pixel PX.

In this on-state, a part of the backup light having entered the liquid crystal display panel LPN from the backlight 4 is transmitted through the first polarizing plate PL1 and enters the liquid crystal display panel LPN. The backup light having entered the liquid crystal layer LQ changes its polarized state. In this on-state, at least a part of the light having passed through the liquid crystal layer LQ is transmitted through the second polarizing plate PL2 (white display).

FIG. 6 is a schematic plan view showing a structure example of one pixel PX when a liquid crystal display panel LPN of a liquid crystal display apparatus according to a comparative example is viewed from the countersubstrate side. Note that in the explanation of this comparative example, the same reference numerals as in the above-mentioned embodiment denote the same parts, and an explanation thereof will be omitted.

In this example, the arrangement of a pixel electrode PE differs from that of the liquid crystal display apparatus of the above embodiment. That is, the pixel electrode PE includes main pixel electrodes PA and a contact portion PC and does not include any connecting portion P1. The main pixel electrodes PA extend along the second direction Y from two portions of the contact portion PC to the upper end portion of the pixel PX. The liquid crystal display apparatus of the comparative example is the same as that of the above embodiment except for this point.

When no connecting portion P1 is formed as described above, if the main pixel electrode PA is partially broken, a signal is applied to only a portion closer to the contact portion PC than the broken portion of the main pixel electrode PA, and no signal is applied to the distal end formed ahead of the broken portion. This makes it impossible to generate a desired electric field in a liquid crystal layer LQ, and sometimes causes a display error such as a point defect.

Also, when no connecting portion P1 is formed, the main pixel electrode PA functions as a lightning conductor and sometimes electrostatically destroys the pixel electrode PE, a switching element SW, and the like. Consequently, the pixel PX cannot display a desired image, thereby causing a display error.

In contrast to this comparative example, in the liquid crystal display apparatus of this embodiment, the connecting portion P1 electrically connects the extended distal ends of the main pixel electrodes PA. Even if the main pixel electrode PA is partially broken, therefore, a signal is applied from the other main pixel electrode PA to the distal end formed ahead of the broken portion via the connecting portion P1. Accordingly, a display error such as a point defect can be avoided.

Also, since the extended distal end of the main pixel electrode PA is connected to the connecting portion P1, the main pixel electrode PA does not function as a lightning conductor.

This makes it possible to avoid electrostatic destruction of the pixel electrode PE, switching element SW, and the like, and avoid a display error.

Note that in the X-Y plane of the liquid crystal display apparatus of this embodiment, secondary common electrode CBB is formed between the pixel electrodes PE of the pixels PX whose connecting portions P1 of the pixel electrodes PE are juxtaposed in the second direction Y. Also, in the X-Y plane of one pixel, the pixel electrode PE is formed on the array substrate AR inside the common electrodes CE formed on the countersubstrate. In other words, the pixel electrode PE is surrounded by the common electrodes CE in one pixel. In this arrangement, as shown in FIG. 5, each pixel has the start and end points of an electric force line, so the electric force line of the pixel does not leak to any adjacent pixel. This prevents electric fields to be applied to the liquid crystal layers LQ of the pixels PX adjacent to each other in the second direction Y from affecting each other. Since liquid crystal molecules in a pixel do not move under the influence of an electric field from any adjacent pixel, deterioration of the display quality can be suppressed.

That is, this embodiment as described above can suppress deterioration of the display quality.

FIG. 7 is a schematic plan view showing another structure example of one pixel PX when the liquid crystal display panel LPN shown in FIG. 1 is viewed from the countersubstrate side. Note that in the following explanation, the same reference numerals as in the above-described embodiment denote the same parts, and an explanation thereof will be omitted.

In this example, a plurality of openings PO are formed in the pixel electrode PE of the pixel PX. Note that in this example, the width of the pixel PX in the first direction X is about 70 µm, and the width of the pixel PX in the second direction Y is about 210 µm.

The pixel electrode PE includes main pixel electrodes PA, a connecting portion P1, and a contact portion PC electrically connected to each other. The contact portion PC is formed near the lower end portion of the pixel PX. The main pixel electrodes PA linearly extend along the second direction Y from three portions of the contact portion PC to the vicinity of the upper end portion of the pixel PX. The main pixel electrodes PA are electrically connected to each other by the connecting portion P1 extending in the first direction X in the vicinity of the upper end portion of the pixel PX. That is, the two openings PO surrounded by the main pixel electrodes PA, connecting portion P1, and contact portion PC are formed. The openings PO are juxtaposed in the first direction X between source lines S1 and S2. The contact portion PC is positioned in a region overlapping the auxiliary capacitance line C1, and electrically connected to the switching element SW through the contact hole CH. The contact portion PC is made wider than the main pixel electrode PA.

Common electrodes CE include main common electrodes CA and secondary common electrodes CB. In the X-Y plane, the main common electrodes CA linearly extend along the second direction Y almost parallel to the main pixel electrodes PA on either side of the main pixel electrodes PA. Alternatively, the main common electrodes CA oppose the source lines S or openings PO and extend almost parallel to the main pixel electrodes PA. The main common electrode CA as described above is formed into a band-like shape having almost the same width along the first direction X.

In the example shown in FIG. 7, four main common electrodes CA are arranged parallel to one another along the first direction X, and arranged on the left and right end portions of the pixel PX and in the central portions of the openings PO. In the following explanation, the main common electrode on the left side of FIG. 7 will be called CAL, the main common electrode on the right side of FIG. 7 will be called CAR, the main common electrode on the left side in the center of FIG. 7 will be called CACL, and the main common electrode on the right side in the center of FIG. 7 will be called CACR, in order to distinguish between the main common electrodes CA. Main common electrode CAL opposes source line S1, main common electrode CAR opposes source line S2, main common electrode CACL opposes the left opening PO, and main common electrode CACR opposes the right opening PO. Main common electrodes CAL, CAR, CACL, and CACR are electrically connected to each other inside or outside the active area.

In the pixel PX, main common electrode CAL is formed on the left end portion, and main common electrode CAR is formed on the right end portion. Strictly speaking, main common electrode CAL is formed over the boundary between the pixel PX and an adjacent pixel on the left side, and main common electrode CAR is formed over the boundary between the pixel PX and an adjacent pixel on the right side. Each of main common electrodes CACL and CACR is formed in almost the center of the opening PO of the pixel PX in the first direction X.

In the X-Y plane, the secondary common electrodes CB linearly extend along the first direction X between the openings PO of the pixel electrodes PE juxtaposed in the second direction Y. The secondary common electrodes CB extend almost perpendicularly to the main pixel electrodes PA. The secondary common electrode CB as described above is formed into a band-like shape having almost the same width along the second direction Y.

In the example shown in FIG. 7, the secondary common electrodes CB are arranged between the pixel electrodes PE juxtaposed in the second direction Y, and arranged in the upper and lower end portions of the pixel PX. In the following explanation, the secondary common electrode on the upper side of FIG. 7 will be called CBU, and the secondary common electrode on the lower side of FIG. 7 will be called CBB, in order to distinguish between the secondary common electrodes CB. Secondary common electrode CBU opposes gate line G1, and secondary common electrode CBB opposes gate line G2. Secondary common electrodes CBU and CBB are electrically connected to each other inside or outside the active area.

In the pixel PX, secondary common electrode CBU is formed in the upper end portion, and secondary common electrode CBB is formed in the lower end portion. Strictly speaking, secondary common electrode CBU is formed over the boundary between the pixel PX and an adjacent pixel above it, and secondary common electrode CBB is formed over the boundary between the pixel PX and an adjacent pixel below it.

The positional relationship between the pixel electrode PE and main common electrodes CA is such that the main pixel electrodes PA and main common electrodes CA are alternately arranged along the first direction X. The main pixel electrodes PA and main common electrodes CA are arranged almost parallel to one another. In the X-Y plane, main common electrodes CAL, CAR, CACL, and CACR do not overlap the main pixel electrodes PA.

That is, one main pixel electrode PA exists between the adjacent main common electrodes CAL and CACL, between the adjacent main common electrodes CACL and CACR, and between the adjacent main common electrodes CAR and CACR. In other words, main common electrodes CAL, CAR, CACL, and CACR are arranged on either side of a position immediately above each main pixel electrode PA. Alternatively, the main pixel electrodes PA are arranged between main common electrodes CAL and CACL, between main common electrodes CACL and CACR, and between main common electrodes CACR and CAR. Accordingly, main common electrode CAL, main pixel electrode PA, main common electrode CACL, main pixel electrode PA, main common electrode CACR, main pixel electrode PA, and main common electrode CAR are arranged in this order along the first direction X.

The spacings between the pixel electrode PE and common electrodes CE along the first direction X are almost constant. That is, the spacing between main common electrode CAL and main pixel electrode PA along the first direction X, the spacing between main common electrode CACL and main pixel electrode PA along the first direction X, and the spacing between main common electrode CACR and main pixel electrode PA along the first direction X are almost equal.

In the liquid crystal display apparatus shown in FIG. 7, the connecting portion P1 electrically connects the extended distal ends of the main pixel electrodes PA. Even when the main pixel electrode PA is partially broken, therefore, the other main pixel electrode PA applies a signal to the distal end formed ahead of the broken portion via the connecting portion P1. Consequently, a display error such as a point defect can be avoided.

Also, since the extended distal end of the main pixel electrode PA is connected to the connecting portion P1, it is possible to avoid the main pixel electrode PA from becoming a lightning conductor. This makes it possible to avoid electrostatic destruction of the pixel electrode PE, switching element SW, and the like, and avoid a display error.

Note that in the X-Y plane of the liquid crystal display apparatus of this embodiment, secondary common electrode CBB is formed between the pixel electrodes PE of the pixels PX whose connecting portions P1 of the pixel electrodes PE are juxtaposed in the second direction Y. Note also that when one pixel is viewed in the X-Y plane, the pixel electrode PE is formed on the array substrate AR inside the common electrodes CE formed on the countersubstrate. In other words, the pixel electrode PE is surrounded by the common electrodes CE in one pixel. This prevents electric fields to be applied to the liquid crystal layers LQ of the pixels PX adjacent to each other in the second direction Y from affecting each other, thereby suppressing deterioration of the display quality. That is, this embodiment as described above can suppress deterioration of the display quality.

Furthermore, in this embodiment, a high transmittance is obtained in the electrode spacing between the pixel electrode PE and common electrode CE. Therefore, the transmittance per pixel can sufficiently be increased by increasing the inter-electrode distance between the pixel electrode PE and main common electrodes CAL and CAR. Also, for product specifications different in pixel pitch, the peak condition of the transmittance distribution can be used by changing the inter-electrode distance (i.e., by changing the position of the main common electrode CA with respect to the pixel electrode PE positioned in almost the center of the pixel PX). That is, in the display mode of this embodiment, from low-resolution product specifications having a relatively large pixel pitch to high-resolution product specifications having a relatively small pixel pitch, it is possible to provide products having various pixel pitches by setting the inter-electrode distance, without any micro electrode processing. Accordingly, it is readily possible to achieve requirements for high transmittance and high resolution.

In this embodiment, the transmittance sufficiently decreases in the transmittance distribution in a region overlapping the black matrix BM. This is so because no electric field leaks outside the pixel from the position of the common electrode CE, and no undesired transverse electric field is generated between adjacent pixels sandwiching the black matrix BM, so liquid crystal molecules in the region overlapping the black matrix BM keep the same initial aligned state as in the off-state (or in the black display state). Even when adjacent pixels have different filter colors, therefore, it is possible to suppress color mixing, thereby suppressing the decrease in color reproduction and the decrease in contrast ratio.

If misalignment occurs between the array substrate AR and countersubstrate CT, a difference may be produced between the horizontal inter-electrode distances between the pixel electrode PE and the common electrodes CE sandwiching the pixel electrode PE. Since, however, this misalignment occurs in all the pixels PX, there is no difference between the electric field distributions in the pixels PX, so the influence on image display is extremely small. Also, even if misalignment occurs between the array substrate AR and countersubstrate CT, it is possible to suppress an undesired electric field leak to an adjacent pixel. Even when adjacent pixels have different filter colors, therefore, it is possible to suppress color mixing, thereby suppressing the decrease in color reproduction and the decrease in contrast ratio.

In this embodiment, main common electrodes CAR and CAL oppose the source lines S. Especially when main common electrodes CAL and CAR are respectively arranged immediately above source lines S1 and S2, it is possible to enlarge the aperture AP and increase the transmittance of the pixel PX, compared to a structure in which main common electrodes CAL and CAR are arranged closer to the pixel electrode PE than source lines S1 and S2.

In addition, when main common electrodes CAL and CAR are respectively arranged immediately above source lines S1 and S2, it is possible to increase the inter-electrode distances between the pixel electrode PE and main common electrodes CAL and CAR, and form a transverse electric field closer to the horizontal direction. This makes it possible to maintain a wide viewing angle as the advantage of, for example, the IPS mode as the conventional arrangement.

Also, in this embodiment, a plurality of domains can be formed in one pixel. Since, therefore, the viewing angle can be compensated for in a plurality of directions, a wide viewing angle can be obtained.

Note that in the above-mentioned example, the initial alignment direction of the liquid crystal molecules LM is parallel to the second direction Y. As shown in FIG. 2, however, the initial alignment direction of the liquid crystal molecules LM may also be an oblique direction D obliquely intersecting the second direction Y. An angle θ1 the initial alignment direction D makes with the second direction Y is greater than 0° and smaller than 45°. Note that it is extremely effective to set the angle θ1 at desirably about 5 to 30°, and more desirably, 20° or less, from the viewpoint of alignment control of the liquid crystal molecules LM. That is, the initial alignment direction of the liquid crystal molecules LM is desirably almost parallel to a direction within the range of 0 to 20° with respect to the second direction Y.

Also, in the above-mentioned example, the liquid crystal layer LQ is made of a liquid crystal material having positive dielectric anisotropy. However, the liquid crystal layer LQ may also be made of a liquid crystal material having negative dielectric anisotropy. Although a detailed explanation will be omitted, however, when using the negative liquid crystal material, the angle θ1 described above is 45 to 90°, desirably, 70° or more, because the positive dielectric anisotropy changes to the negative one.

Note that even in the on-state, almost no transverse electric field is formed (or an electric field sufficient to drive the liquid crystal molecules LM is not formed) on the pixel electrode PE or on the common electrode CE, so the liquid crystal molecules LM hardly move from the initial alignment direction as in the off-state. Therefore, even when the pixel electrode PE and common electrode CE are made of a light-transmitting conductive material such as ITO, almost no backup light is transmitted through these regions and contributes to display in the on-state. Accordingly, the pixel electrode PE and common electrode CE need not be made of a transparent conductive material, and may also be formed by using a conductive material such as aluminum, silver, or copper.

In this embodiment, the common electrodes CE can also include a second main common electrode facing the source line S formed on the array substrate AR, in addition to the main common electrodes CA formed on the countersubstrate CT. This second main common electrode extends almost parallel to the main common electrode CA, and has the same potential as that of the main common electrode CA. The second main common electrode can shield an unwanted electric field from the source line S.

Also, the common electrodes CE can include a second secondary common electrode facing the gate line G or auxiliary capacitance line C formed on the array substrate AR, in addition to the main common electrodes CA formed on the countersubstrate CT. This second secondary common electrode extends in a direction perpendicular to the main common electrode CA, and have the same potential as that of the main common electrode CA. The second secondary common electrode can shield an unwanted electric field from the gate line G or auxiliary capacitance line C. The arrangement including the second main common electrode and second secondary common electrode as described above can further suppress deterioration of the display quality.

As has been explained above, this embodiment can provide a liquid crystal display apparatus capable of suppressing deterioration of the display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display apparatus comprising:
a first substrate including a pixel electrode including a contact portion, main pixel electrodes extending in a second direction perpendicular to a first direction from two end portions of the contact portion in the first direction, and a connecting portion electrically connecting extended distal ends of the main pixel electrodes;
a second substrate including a common electrode including main common electrodes extending substantially parallel to the main pixel electrode on either side of the main pixel electrode in the first direction, and secondary common electrodes extending between the main common electrodes between the pixel electrodes juxtaposed in the second direction; and
a liquid crystal layer containing liquid crystal molecules held between the first substrate and the second substrate;
wherein
the first substrate includes source lines extending in the second direction;
the main common electrodes arranged on either side of the pixel electrode oppose the source lines;
the first substrate includes a first gate line and a second gate line extending in the first direction, an auxiliary capacitance line between the first gate line and the second gate line, and a drain electrode formed in the center of the pixel electrode in the first direction;
the secondary common electrodes oppose the first gate line and the second gate line;
the contact portion is formed in the center of a pixel in the first direction;
the pixel electrode is surrounded by the common electrode in the pixel;
a spacing between the pixel electrode and common electrode along the first direction are constant, and the main pixel electrodes and main common electrodes are alternately arranged along the first direction;
the auxiliary capacitance line is closer to the second gate line than to the first gate line, and comprises a projection which projects toward the second gate line and opposes the contact portion;
the main pixel electrodes extend from the contact portion toward the first gate line; and
the drain electrode is electrically connected to the contact portion through two contact holes which are arranged along the first direction and are formed at symmetrical positions with respect to a centerline of the pixel.

2. A liquid crystal display apparatus comprising:
a first substrate including a pixel electrode having an opening;
a second substrate including a common electrode including main common electrodes extending in a second direction perpendicular to a first direction on either side of the pixel electrode in the first direction and in a position facing the opening, and secondary common electrodes extending between the main common electrodes between the opening juxtaposed in the second direction; and
a liquid crystal layer containing liquid crystal molecules held between the first substrate and the second substrate;
wherein the opening has a substantially rectangular shape;
the first substrate includes source lines extending in the second direction;
the main common electrodes arranged on either side of the pixel electrode oppose the source lines;
the first substrate includes a first gate line and a second gate line extending in the first direction, an auxiliary capacitance line between the first gate line and the second gate line, and a drain electrode formed in the center of the pixel electrode in the first direction;
the secondary common electrodes oppose the first gate line and the second gate line;
the opening is formed in the center of a pixel in the first direction;
the pixel electrode is surrounded by the common electrode in the pixel;
a spacing between the pixel electrode and common electrode along the first direction are constant, and the main pixel electrodes and main common electrodes are alternately arranged along the first direction;

the auxiliary capacitance line is closer to the second gate line than to the first gate line, and comprises a projection which projects toward the second gate line and opposes the pixel electrode;

the pixel electrode extends from a position opposing the projection toward the first gate line; and the drain electrode is electrically connected to the pixel electrode through two contact holes which are arranged along the first direction and are formed at symmetrical positions with respect to a centerline of the pixel.

3. A liquid crystal display apparatus comprising:

a first substrate including a pixel electrode including a contact portion, main pixel electrodes extending in a second direction perpendicular to a first direction from two end portions and a central portion of the contact portion in the first direction, and a connecting portion electrically connecting extended distal ends of the main pixel electrodes;

a second substrate including a common electrode including main common electrodes extending substantially parallel to the main pixel electrode on either side of the pixel electrode in the first direction, and secondary common electrodes extending between the main common electrodes between the pixel electrodes juxtaposed in the second direction; and a liquid crystal layer containing liquid crystal molecules held between the first substrate and the second substrate;

wherein the first substrate includes source lines extending in the second direction;

the main common electrodes arranged on either side of the pixel electrode oppose the source lines;

the first substrate includes a first gate line and a second gate line extending in the first direction, an auxiliary capacitance line between the first gate line and the second gate line, and a drain electrode formed in the center of the pixel electrode in the first direction;

the secondary common electrodes oppose the first gate line and the second gate line;

the main pixel electrodes are surrounded by the main common electrodes and the secondary common electrodes;

the contact portion is formed in the center of a pixel in the first direction;

the pixel electrode is surrounded by the common electrode in the pixel;

a spacing between the pixel electrode and common electrode along the first direction are constant, and the main pixel electrodes and main common electrodes are alternately arranged along the first direction;

the auxiliary capacitance line is closer to the second gate line than to the first gate line, and comprises a projection which projects toward the second gate line and opposes the contact portion;

the main pixel electrodes extend from the contact portion toward the first gate line; and the drain electrode is electrically connected to the contact portion through two contact holes which are arranged along the first direction and are formed at symmetrical positions with respect to a centerline of the pixel.

4. A liquid crystal display apparatus comprising:

a first substrate including a pixel electrode having a plurality of openings juxtaposed in a first direction;

a second substrate including a common electrode including main common electrodes extending in a second direction perpendicular to the first direction on either side of the pixel electrode in the first direction and in positions facing the openings, and secondary common electrodes extending between the main common electrodes between the openings juxtaposed in the second direction; and a liquid crystal layer containing liquid crystal molecules held between the first substrate and the second substrate;

wherein the opening has a substantially rectangular shape;

the first substrate includes source lines extending in the second direction;

the main common electrodes arranged on either side of the pixel electrode oppose the source lines;

the first substrate includes a first gate line and a second gate line extending in the first direction, an auxiliary capacitance line between the first gate line and the second gate line, and a drain electrode formed in the center of the pixel electrode in the first direction;

the secondary common electrodes oppose the first gate line and the second gate line;

the opening is formed in the center of a pixel in the first direction;

the pixel electrode is surrounded by the common electrode in the pixel;

a spacing between the pixel electrode and common electrode along the first direction are constant, and the main pixel electrodes and main common electrodes are alternately arranged along the first direction;

the auxiliary capacitance line is closer to the second gate line than to the first gate line, and comprises a projection which projects toward the second gate line and opposes the pixel electrode;

the pixel electrode extends from a position opposing the projection toward the first gate line; and the drain electrode is electrically connected to the pixel electrode through two contact holes which are arranged along the first direction and are formed at symmetrical positions with respect to a centerline of the pixel.

5. A liquid crystal display apparatus comprising:

a first substrate including a first gate line and a second gate line extending in a first direction, an auxiliary capacitance line between the first gate line and the second gate line, a pixel electrode including a contact portion, main pixel electrodes extending in a second direction perpendicular to the first direction from two end portions of the contact portion in the first direction, and a connecting portion electrically connecting extended distal ends of the main pixel electrodes, and a switching element formed below the contact portion and including a drain electrode electrically connected to the contact portion and formed in the center of the pixel electrode in the first direction;

a second substrate including a common electrode including main common electrodes extending substantially parallel to the main pixel electrode on either side of the pixel electrode, and secondary common electrodes extending between the main common electrodes between the pixel electrodes juxtaposed in the second direction; and a liquid crystal layer containing liquid crystal molecules held between the first substrate and the second substrate, wherein the pixel electrode has a symmetrical shape with respect to a formation position of the drain electrode in the first direction;

the auxiliary capacitance line is closer to the second gate line than to the first gate line, and comprises a projection which projects toward the second gate line and opposes the contact portion;

the main pixel electrodes extend from the contact portion toward the first gate line; and the drain electrode is electrically connected to the contact portion through two contact holes which are arranged along the first direction and are formed at symmetrical positions with respect to a centerline of a pixel.

6. The apparatus according to claim 5, wherein the switching element includes a source electrode including two end portions, the drain electrode is formed between two end portions.

* * * * *